US007849506B1

(12) United States Patent
Dansey et al.

(10) Patent No.: US 7,849,506 B1
(45) Date of Patent: Dec. 7, 2010

(54) SWITCHING DEVICE, METHOD, AND COMPUTER PROGRAM FOR EFFICIENT INTRUSION DETECTION

(75) Inventors: Stephen Thomas Dansey, Sunnyvale, CA (US); Zenon Kuc, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1143 days.

(21) Appl. No.: 10/964,213

(22) Filed: Oct. 12, 2004

(51) Int. Cl.
G06F 11/00 (2006.01)
G06F 12/16 (2006.01)

(52) U.S. Cl. .............................. 726/22; 726/23; 726/24; 726/25; 713/188

(58) Field of Classification Search .................... 726/25
See application file for complete search history.

(56) References Cited

U.S. PATENT DOCUMENTS

| | | | |
|---|---|---|---|
| 6,308,148 B1 * | 10/2001 | Bruins et al. .................. 703/27 |
| 6,392,996 B1 | 5/2002 | Hjalmtysson |
| 6,463,148 B1 | 10/2002 | Brady |
| 6,578,147 B1 | 6/2003 | Shanklin et al. |
| 6,725,377 B1 | 4/2004 | Kouznetsov |
| 6,807,156 B1 | 10/2004 | Veres et al. |
| 7,085,911 B2 | 8/2006 | Sachedina et al. |
| 7,331,061 B1 * | 2/2008 | Ramsey et al. ................. 726/23 |
| 2001/0005371 A1 * | 6/2001 | Sera ............................ 370/394 |
| 2002/0069356 A1 * | 6/2002 | Kim ............................ 713/160 |
| 2002/0093917 A1 | 7/2002 | Knobbe et al. |
| 2003/0182580 A1 * | 9/2003 | Lee ............................. 713/201 |
| 2004/0003094 A1 * | 1/2004 | See ............................. 709/227 |
| 2004/0003284 A1 * | 1/2004 | Campbell et al. ............ 713/201 |
| 2004/0093513 A1 * | 5/2004 | Cantrell et al. ............... 713/201 |
| 2004/0177110 A1 * | 9/2004 | Rounthwaite et al. ........ 709/202 |
| 2005/0028013 A1 * | 2/2005 | Cantrell et al. ............... 713/201 |
| 2005/0050336 A1 * | 3/2005 | Liang et al. .................. 713/188 |
| 2005/0076227 A1 * | 4/2005 | Kang et al. ................... 713/188 |
| 2005/0076228 A1 * | 4/2005 | Davis et al. .................. 713/188 |
| 2005/0076246 A1 * | 4/2005 | Singhal ........................ 713/201 |
| 2005/0249214 A1 * | 11/2005 | Peng ............................ 370/392 |
| 2006/0023709 A1 * | 2/2006 | Hall et al. .................... 370/389 |

OTHER PUBLICATIONS

"Cisco Catalyst 6500 Series and Cisco 7600 Series Network Analysis Module 1 and 2," Cisco Systems, Inc., 1992-2004, pp. 1-14.
"Netflow & Network-Based Application Recognition," ITD Product Management, Nov. 2003, Cisco Systems, Inc., pp. 1-11.

(Continued)

*Primary Examiner*—Emmanuel L Moise
*Assistant Examiner*—Luu Pham
(74) *Attorney, Agent, or Firm*—Chapin IP Law, LLC; David W. Rouille, Esq.

(57) ABSTRACT

A switching device, method, and computer program utilizes a copy technique to detect unauthorized access to a communications network. An interface of the switching device is connected to receive an original packet and copy the original packet to create a copied packet. A processor within the switching device is operable to analyze information related to the original packet or the copied packet to detect an anomaly related to the original packet or the copied packet. The processor is further operable to cause the copied packet to be forwarded to an intrusion detection system within the communications network upon detecting the anomaly.

19 Claims, 4 Drawing Sheets

OTHER PUBLICATIONS

"Cisco IOS Netflow Overview," ITD Product Management, Feb. 2004, Cisco Systems, Inc., pp. 1-26.

"NetFlow gives network managers a detailed view of application flows on the network," Cisco Systems, Inc., 2003, pp. 1-11.

"NetFlow Performance Analysis," Cisco Systems, Inc., 1992-2002, pp. 1-21.

"Cisco IOS NetFlow Technology," Data Sheet, Cisco Systems, Inc., 2000, pp. 1-3.

"NetFlow Services and Applications," Cisco Systems, Inc., 1999, pp. 1-27.

"Random Sampled NetFlow," Cisco Systems, Inc., 2003, pp. 1-24.

"Enhancing Security with sFlow Technology," Foundry Networks, Inc., May 2003, Version 1.0.1, pp. 1-15.

"Concord Communications-Enhancing VPN Management for Service Providers and Enterprises," Cisco Systems, Inc., 1992-2002, pp. 1-4.

Office Action mailed Dec. 11, 2007 in U.S. Appl. No. 10/962,882.

Office Action mailed Aug. 14, 2008 in U.S. Appl. No. 10/962,882.

Office Action issued by the United States Patent and Trademark Office on Dec. 18, 2008 in U.S. Appl. No. 10/962,882, filed Oct. 12, 2004.

Office Action issued by the United States Patent and Trademark Office on May 11, 2009 in connection with U.S. Appl. No. 10/962,882, filed Oct. 12, 2004.

* cited by examiner

SWITCHING DEVICE, METHOD, AND COMPUTER PROGRAM FOR EFFICIENT INTRUSION DETECTION

CROSS-REFERENCE TO RELATED APPLICATION

This application is related by subject matter to U.S. patent application Ser. No. 10/962,862 filed on Oct. 12, 2004, and which is hereby incorporated by reference.

TECHNICAL FIELD

This disclosure relates generally to switching networks and more specifically to a switching device, method, and computer program for increasing the per-port effectiveness of intrusion detection.

BACKGROUND

In a communications network, information (e.g., voice or data) in the form of packets is routed between endpoints through one or more switching devices (e.g., routers and telecommunications switches). To prevent unauthorized access to the communications network, network managers have begun implementing Intrusion Detection systems. Intrusion Detection systems (IDS) continually monitor traffic in the communications network and identify known patterns of attack utilizing various detection techniques. When an intrusion is detected, the IDS typically notifies a network administrator and implements other predetermined or programmed responses. For example, the IDS may generate an alarm, report the attack, log the attack and/or terminate the intruder's connection.

The IDS is typically implemented on a server attached to the communications network. The server may be any type of computer on which intrusion detection software is loaded. The intrusion detection software examines packets entering and exiting the communications network to detect any anomalies, such as traffic load, TCP port usage or matching "signatures" of known types of intrusion attacks. If an anomaly is detected, the incoming or outgoing packet flow is labeled inappropriate. As used herein, the term packet flow refers to a unidirectional stream of packets sent between a source endpoint and a destination endpoint.

However, implementing the IDS on a server separate from the switching devices in the communications network limits the IDS processing capability and performance. For example, when positioning the IDS at the edge of the communications network, the communications links between the IDS and the external network and between the IDS and the switching devices each have limited bandwidth. In addition, the IDS server itself has limited processing capability. Therefore, as the traffic on the communications network increases, the limitations of bandwidth and processing capability either prevents the growth of the communications network or necessitates the use of additional IDS servers to perform intrusion detection for the communications network.

Recently, IDS boards have become available that can be directly implemented on the network switches and routers. The IDS boards provide the same functionality as the IDS server, but may be applicable to only a single switch or router. Therefore, aggregate data between multiple switching devices of the type normally used to identify intrusion attacks is more difficult to accumulate, which may result in missed intrusion alerts. In addition, the IDS boards require a physical space on the switching devices that could be used for other applications. The additional hardware also adds cost and complexity to the switching devices.

SUMMARY

This disclosure provides a switching device, method, and computer program for detecting unauthorized access to a communications network.

In one aspect, an interface of the switching device receives and copies an original packet to create a copied packet. A processor of the switching device is operable to analyze information related to the original packet or the copied packet to detect an anomaly related to the original packet or the copied packet. The processor is further operable to cause the copied packet to be forwarded to an intrusion detection system within the communications network upon detecting the anomaly.

In a particular aspect, the processor sets a limit on the number of original packets copied and forwarded to the processor by the interface.

In another particular aspect, the information is statistical information related to the interface.

In a further particular aspect, the processor performs a task on the packet upon detecting anomalies related to the packet.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
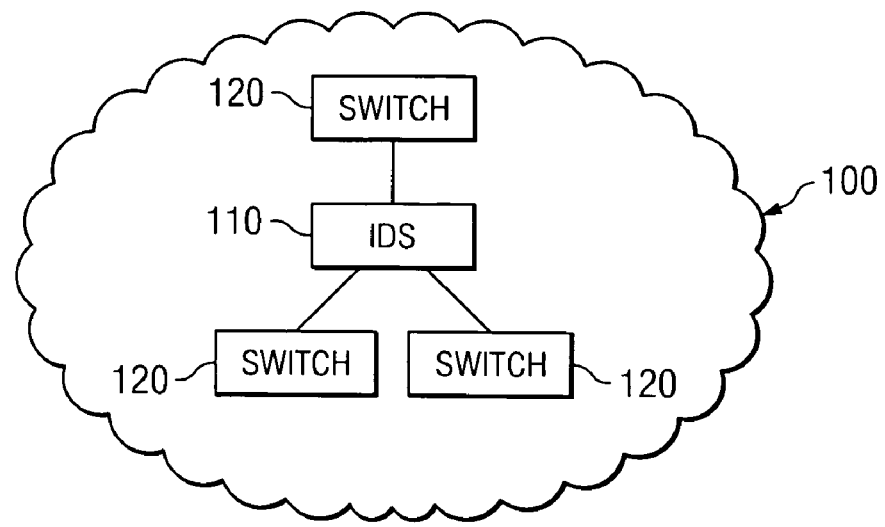
FIG. 1 illustrates an example communications network according to one embodiment of this disclosure.

FIG. 1 illustrates an example communications network 100 for detecting unauthorized access thereto according to one embodiment of this disclosure. The network 100 shown in FIG. 1 is for illustration only. Other embodiments of the network 100 may be used without departing from the scope of this disclosure.

In the illustrated example, the network 100 includes an Intrusion Detection system (IDS) server 110 and switching devices 120.

The network 100 facilitates communication between components of the network 100. For example, the network 100 may communicate Internet Protocol ("IP") packets, frame relay frames, Asynchronous Transfer Mode ("ATM") cells, Ethernet, X.25, or other suitable information between network addresses or devices. The network 100 may include one or more local area networks ("LANs"), metropolitan area networks ("MANs"), wide area networks ("WANs"), all or portions of a global network such as the Internet, or any other communication system or systems at one or more locations.

The switching devices 120 are coupled to the network 100. In this document, the term "couple" refers to any direct or indirect communication between two or more components, whether or not those components are in physical contact with each other. The switching devices 120 support communication sessions between endpoints (not shown). Communications sessions include data exchanges or voice conversations between devices or applications over the communications network 100. In one embodiment, the switching devices 120 are routers and/or telecommunications switches for routing packets between the endpoints of the communication session. For example, the endpoints may transmit data, audio, video or other information as one or more packets during a communication session. The packets are routed through the communications network 100 through one or more switching devices 120. The sequence of packets unidirectionally sent from one endpoint to another endpoint is known as a flow. However, it should be understood that in other embodiments, a flow may be bidirectional instead of unidirectional.

The switching devices 120 can support various standards or protocols used to set up, maintain, and terminate communication sessions. As examples, the switching devices 120 could communicate unicast and multicast data, audio, video, or other information using the Session Initiation Protocol ("SIP"), Realtime Transfer Protocol ("RTP") over User Datagram Protocol ("UDP"), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

The switching devices 120 may be constructed or configured using hardware, software, firmware, or combination thereof for supporting communication sessions and switching in the network 100. As an example, the switching devices 120 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein. In one aspect of task, the switching devices 120 include one or more processes, such as software applications providing an activity, a function, or a systematic sequence of tasks that produces a specified result, for handling communication sessions.

The IDS server 110 is coupled to the switching devices 120. The IDS server 110 monitors the traffic on the network 100 for anomalies, such as traffic load, TCP port usage or attacks and other malicious activity. For example, the IDS server 110 may maintain attack pattern information, generally referred to as "signatures," used to identify an attack. The switching devices 120 selectively pass packets to the IDS server 110, as described in more detail below in connection with FIG. 4. The IDS server 110 analyzes a packet, as well as the packet's relationship to other packets in the same packet flow or different packet flows, to detect an anomaly indicative of an intrusion.

The IDS server 110 may be constructed or configured using hardware, software, firmware, or combination thereof for detecting unauthorized access in the network 100. As an example, the IDS server 110 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein. In one aspect of task, the IDS server 110 includes intrusion detection software for monitoring traffic on the communications network 100.

Figure 2:
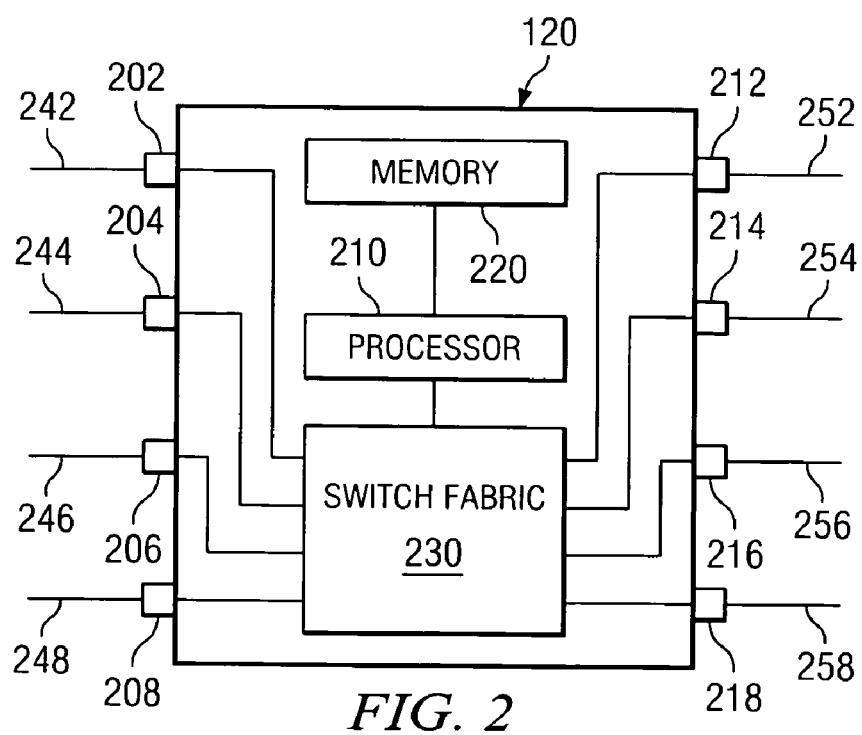
FIG. 2 illustrates an example switching device according to one embodiment of this disclosure.

An example switching device 120 is shown in FIG. 2. The switching device 120 illustrated in FIG. 2 is for illustration only. Other embodiments of the switching device 120 could be used without departing from the scope of this disclosure.

In the illustrated example, the switching device 120 includes input ports 202, 204, 206 and 208, input communications links 242, 244, 246 and 248, output ports 212, 214, 216 and 218, output communications links 252, 254, 256 and 258, a processor 210, a memory 220 and switch logic 230.

The input ports 202, 204, 206 and 208 are connected to receive packets from sending devices via the communications network 100 (shown in FIG. 1). Each input port 202, 204, 206 and 208 is connected to a respective input communications link 242, 244, 246 and 248 over which the packets are transmitted to the switching device 120. The output ports 212, 214, 216 and 218 are connected to output the received packets towards the respective receiving devices addressed in the received packets. Each output port 212, 214, 216 and 218 is connected to a respective output communications link 252, 254, 256 and 258 over which packets are transmitted to the receiving devices.

The input ports 202, 204, 206 and 208 and output ports 212, 214, 216 and 218 each represent any suitable physical interface operable to facilitate communication between the switching device 120 and the communications network 100. The communications links 242, 244, 246, 248, 252, 254, 256 and 258 each represent any form of physical media layer, such as Ethernet, FDDI or HDLC serial link.

The switch logic 230 handles the routing of a particular packet from an input port (e.g., input port 202) to an output port (e.g., output port 214) using routing tables (not shown). In one embodiment, the routing tables are configured in hardware. The routing tables identify the appropriate output port 214 for routing a packet to the receiving device addressed in the packet.

The processor 210 manages the task of the switching device 120. For example, the processor 210 may send and receive routing information to and from the communications network for use in generating or updating the routing tables utilized by the switch logic 230.

In this example embodiment, the processor 210 analyzes information related to packets received by the switch logic 230 to detect any anomalies related to the packets. As used herein, the term anomaly refers to a deviation from a baseline task. For example, the baseline task can be derived from statistical information regarding normal traffic patterns, such as the number of packets typically received at a particular time of day, size of packets typically received from a source or destination endpoint and other packet behaviors. In one embodiment, a threshold is used as the baseline task against which the packet is measured to detect an anomaly. In another embodiment, protocol port information or a "signature" representing an attack is used as the baseline task.

If the processor 210 detects an anomaly, the processor implements a predetermined or programmed response. In one embodiment, the processor 210 copies and routes the abnormal packet to the IDS server 110 (shown in FIG. 1). In another embodiment, the processor 210 copies) and routes multiple packets within the flow associated with the abnormal packet to the IDS server. As used herein, a flow refers to a unidirectional or bidirectional stream of packets transmitted between two network devices. A flow may be identified by the network-layer addresses and port numbers of the devices or by other factors, such as other information in packet headers, packet length, time of packet transmission, network conditions, or any other factor sufficient to identify a flow.

In a further embodiment, the processor 210 copies and routes all packets received at the port from which the abnormal packet was received to the IDS server for a duration of time, until an error is received at the port or any other event occurs. In a still further embodiment, the processor 210 instructs the switch logic 230 to copy and route all packets related to the same flow or all packets received at a particular port directly to the IDS server.

In an additional embodiment, the processor 210 performs a task upon detecting an anomaly related to the packet. For example, the processor 210 can terminate the connection associated with the packet. As another example, the processor 210 can generate an alarm or otherwise notify a network administrator of the potential attack.

The processor 210 includes any hardware, software, firmware, or combination thereof for receiving copied packets and analyzing the copied packets to detect an intrusion. For example, the processor 210 may include one or more microprocessors, microcontrollers, programmable logic devices, digital signal processors or other type of processing devices that are configured to execute instructions of an anti-intrusion computer program, and one or more memories (e.g., cache memory) that store the instructions and other data used by the processor 210. However, it should be understood that other embodiments of the processor 210 may be used.

The memory 220 stores the baseline task for comparison with the packet to detect an anomaly. The memory 220 may also provide access to any other or additional information. For example, in some embodiments, the memory 220 stores the anti-intrusion computer program executed by the processor 210 and other data used by the processor 210 during execution of the anti-intrusion computer program.

The memory 220 is any type of data storage device, including but not limited to, a hard drive, random access memory (RAM), read only memory (ROM), compact disc, floppy disc, ZIP® drive, tape drive, database or other type of storage device or storage medium.

Figure 3:
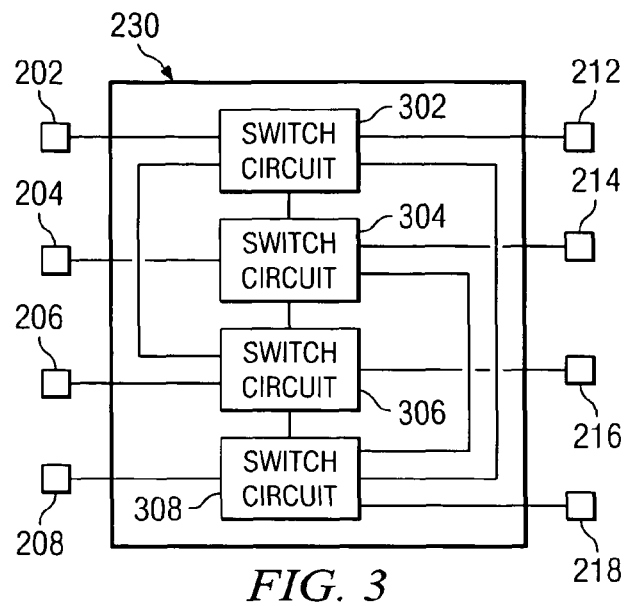
FIG. 3 illustrates an example switch logic according to one embodiment of this disclosure.

FIG. 3 illustrates an example switch logic 230 according to one embodiment of this disclosure. The switch logic 230 illustrated in FIG. 3 is for illustration only. Other embodiments of the switch logic 230 could be used without departing from the scope of this disclosure.

In the illustrated example, the switch logic 230 includes switch circuits 302, 304, 306 and 308. The switch circuits 302, 304, 306 and 308 each represent a routing circuit capable of routing packets through the communication network. For example, switch circuits 302, 304, 306 and 308 can each be an application specific integrated circuit (ASIC) programmed with routing tables (not shown) for routing packets. It should be understood that the number of switch circuits 302, 304, 306 and 308 varies, depending on the particular switching device 120.

Each switch circuit 302, 304, 306 and 308 is connected to receive packets from one of the input ports 202, 204, 206 and 208 and output packets to one or more of the output ports 212, 214, 216 and 218. The switch circuits 302, 304, 306 and 308 are interconnected with one another to route packets therebetween.

The switch circuits 302, 304, 306 and 308 utilize routing tables (not shown) to determine the appropriate output port 212, 214, 216 and 218 for a particular packet. For example, a packet received on input port 202 is handled by switch circuit 302. Switch circuit 302 utilizes routing tables to determine the output port (e.g., output port 214) for the packet, and routes the packet to the associated switch circuit (e.g., switch circuit 304) for the determined output port 214.

Figure 4:
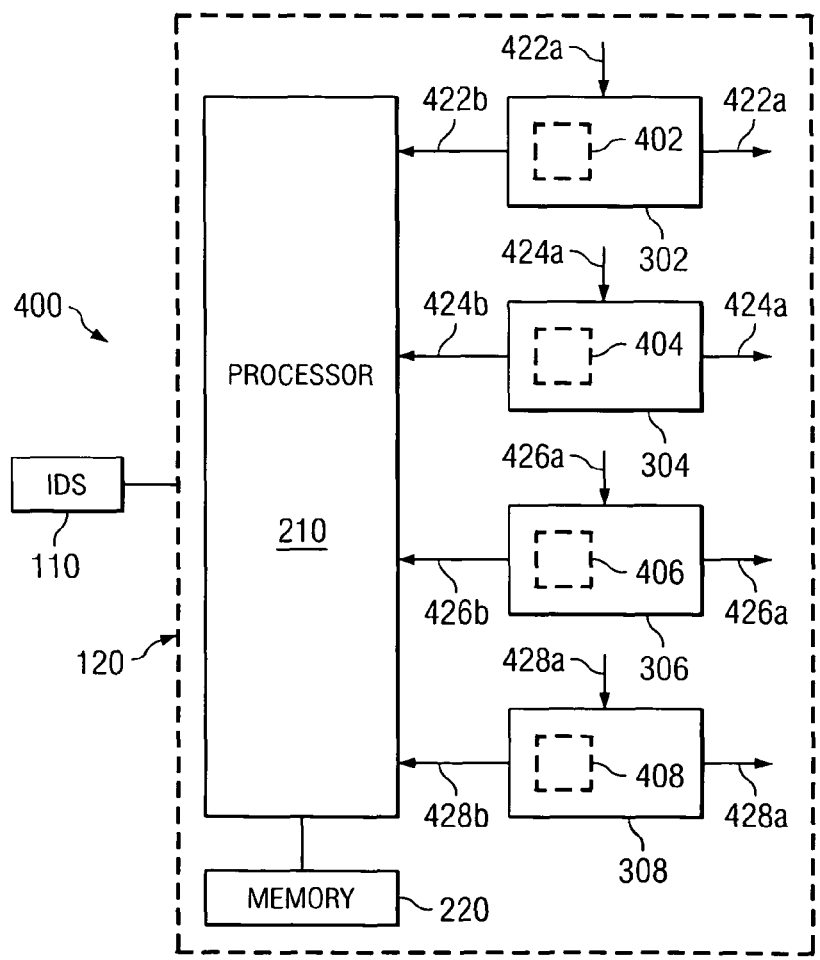
FIG. 4 illustrates an example intrusion detection system according to one embodiment of this disclosure.

FIG. 4 illustrates an example intrusion detection system 400 according to one embodiment of this disclosure. The system 400 shown in FIG. 4 is for illustration only. Other embodiments of the system 400 may be used without departing from the scope of this disclosure.

In the illustrated example, the system 400 includes a switching device 120 and an IDS server 110. The switching device 120 may be the same as or similar to the switching devices 120 shown in FIGS. 2 and 3. For example, as shown in FIG. 4, the switching device 120 includes a processor 210, a memory 220 and switch circuits 302, 304, 306 and 308.

Each switch circuit 302, 304, 306 and 308 is connected to receive a respective incoming packet 422a, 424a, 426a and 428a and output the incoming packets according to the routing tables. For simplicity, in FIG. 4, switch circuit 302 is shown as receiving packet 422a and outputting packet 422a, switch circuit 304 is shown as receiving packet 424a and outputting packet 424a, switch circuit 306 is shown as receiving packet 426a and outputting packet 426a and switch circuit 308 is shown as receiving packet 428a and outputting packet 428a.

Each switch circuit 302, 304, 306 and 308 is further capable of copying their respective incoming packets 422a, 424a, 426a and 428a to create copied packets 422b, 424b, 426b and 428b and forwarding their respective copied packets 422b, 424b, 426b and 428b to the processor 210 or directly to the IDS server 110. In one embodiment, copied packets 422b, 424b, 426b and 428b include the complete packet information included in the respective original packets 422a, 424a, 426a and 428a. In other embodiments, copied packets 422b, 424b, 426b and 428b include only a portion of the original packets 422a, 424a, 426a and 428a.

In one embodiment, the processor 210 analyzes information related to the original packets 422a, 424a, 426a and 428a to detect anomalies related to the packets 422a, 424a, 426a and 428a. For example, the processor 210 can access statistical port information maintained by the switch circuits 302, 304, 306 and 308, such as the number of packets received, size of packets received from a source or destination endpoint, number of error packets received and other packet behaviors to determine if any anomalies have occurred at a particular port. In one implementation embodiment, the statistical port information may be ascertained using counters in the switch circuits 302, 304, 306 and 308.

In another embodiment, the processor 210 analyzes the copied packets 422b, 424b, 426b and 428b sent to the processor 210 from the switch circuits 302, 304, 306 and 308 to detect anomalies related to the copied packets.

The processor 210 further accesses memory 220 to retrieve baseline task information for comparison with the statistical port information and/or copied packets 422b, 424b, 426b and 428b. If an anomaly is detected at a port or in a copied packet (e.g., copied packet 422b), the processor 210 either instructs the switch circuit (e.g., switch circuit 302) to copy and forward copied packet 422b to the IDS server 110 or forwards the copied packet 422b to the IDS server 110 itself. In other embodiments, the processor 210 forwards multiple packets in the same flow as copied packet 422b from the switch circuit 302 to the IDS server 410 (either directly from the switch circuit 302 or from the processor 210). In further embodiments, the processor 210 forwards multiple packets received at switch circuit 302 to the IDS server 110, regardless of whether the packets are in the same flow as copied packet 422b. In still further embodiment, the processor 210 performs a task in lieu of or in addition to forwarding copied packet 422b to the IDS server 110. For example, the processor 210 can generate an alarm or terminate the connection associated with copied packet 422b.

The processor 210 receives copied packets by enabling one or more switch circuits 302, 304, 306 and 308 to copy and forward incoming packets. In one embodiment, the processor 210 enables the switch circuits 302, 304, 306 and 308 sequentially. In another embodiment, the processor 210 enables two or more switch circuits 302, 304, 306 and 308 simultaneously.

For example, in the embodiment shown in FIG. 4, the processor 210 instructs to the switch circuits 302, 304, 306 and 308 to copy incoming packets and forward the copied packets to the processor by setting respective filters 402, 404, 406 and 408 within the switch circuits 302, 304, 306 and 308. Filters 402, 404, 406 and 408 provide a throttling or metering mechanism that prevents the processor 210 from being inundated with too many packets at one time.

The processor 210 sets the filters 402, 404, 406 and 408 with a limit on the number of original packets copied and forwarded to the processor 210 by each switch circuit 302, 304, 306 and 308. In one embodiment, the processor 210 can set each filter 402, 404, 406 and 408 with a maximum byte count. For example, each filter 402, 404, 406 and 408 can be set to send a maximum of 1500 bytes to the processor 210 starting at the time the filter 402, 404, 406 and 408 is set, regardless of the number of packets received at the respective switch circuits 302, 304, 306 and 308. Once the switch circuits 302, 304, 306 and 308 have sent the requisite 1500 bytes, the switch circuits 302, 304, 306 and 308 stop sending packets to the processor 210. Each time the processor sets the filters 402, 404, 406 and 408, the filters 402, 404, 406 and 408 are reset, even if the respective switch circuits 302, 304, 306 and 308 have not yet received and sent 1500 bytes to the processor 210 from the last time the filters 402, 404, 406 and 408 were set.

In another embodiment, the processor 210 sets each filter 402, 404, 406 and 408 with a time period or maximum amount of time that received packets should be copied and forwarded to the processor 210. Thus, all packets received by the respective switch circuits 302, 304, 306 and 308 within the specified time period are copied and forwarded to the processor 210. In further embodiments, the processor 210 can set each filter 402, 404, 406 and 408 with a combination of byte count and time. In still further embodiments, the processor 210 can set each filter 402, 404, 406 and 408 to sample the packets using a one of N sampling rate or a random sampling rate.

It should be understood that switch circuits 302, 304, 306 and 308 can be implemented differently in different types of switching devices, and programmed or instructed to copy packets using mechanisms other than filters 402, 404, 406 and 408. For example, in one embodiment, the processor 210 can send an enable signal to one or more switch circuits 302, 304, 306 and 308 requesting them to send a single packet. Once the processor 210 has completed processing the copied packet(s), the processor 210 can send another enable signal to one or more switch circuits 302, 304, 306 and 308 to send another packet. As another example, in another embodiment, the processor 210 can send an enable signal to one or more switch circuits 302, 304, 306 and 308 to start sending packets. When enough packets are received in a buffer in the processor 210, the processor 210 can send a disable signal to the one or more switch circuits 302, 304, 306 and 308 to stop sending packets.

Although FIG. 4 illustrates one example of a system 400 for processing packets to determine flow data associated with the packets, various changes may be made to FIG. 4. For example, any number of processors 210 and switch circuits 302, 304, 306 and 308 could be used in the system 400.

Figure 5:
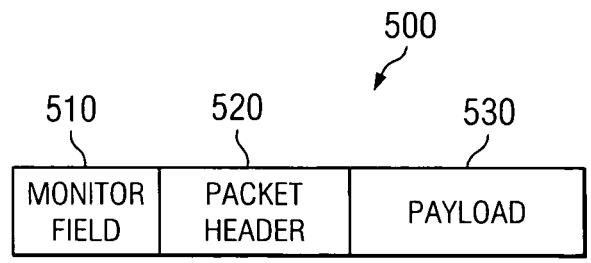
FIG. 5 illustrates an example packet according to one embodiment of this disclosure.

An example copied packet 500 is shown in FIG. 5. The copied packet 500 includes the packet header 520 and complete payload 530 of the original packet. The packet header 520 contains routing information for the packet 500, such as the source address (e.g., network address and port of the sending device) and destination address (e.g., network address and port of the receiving device). The payload 530 contains the voice or data sent by the sending device in the packet. It should be understood that in some embodiments, the copied packet 500 may include only the packet header 520 of the original packet and not the entire payload 530.

In addition, the copied packet 500 includes a monitor field 510, which may be included as part of the packet header 520. The monitor field 510 indicates to the processor 210 (shown in FIG. 4) whether the packet 500 is being sent to the processor to monitor the packet for anomalies. When the monitor field 510 is set, the processor processes the information (e.g., packet header 520 and payload 530) in the copied packet 500 to detect an anomaly related to the copied packet 500. The processor can further analyze the copied packet's 500 relationship to adjacent and related packets in the packet stream from the same or a different port to detect an anomaly related to the copied packet 500.

Figure 6:
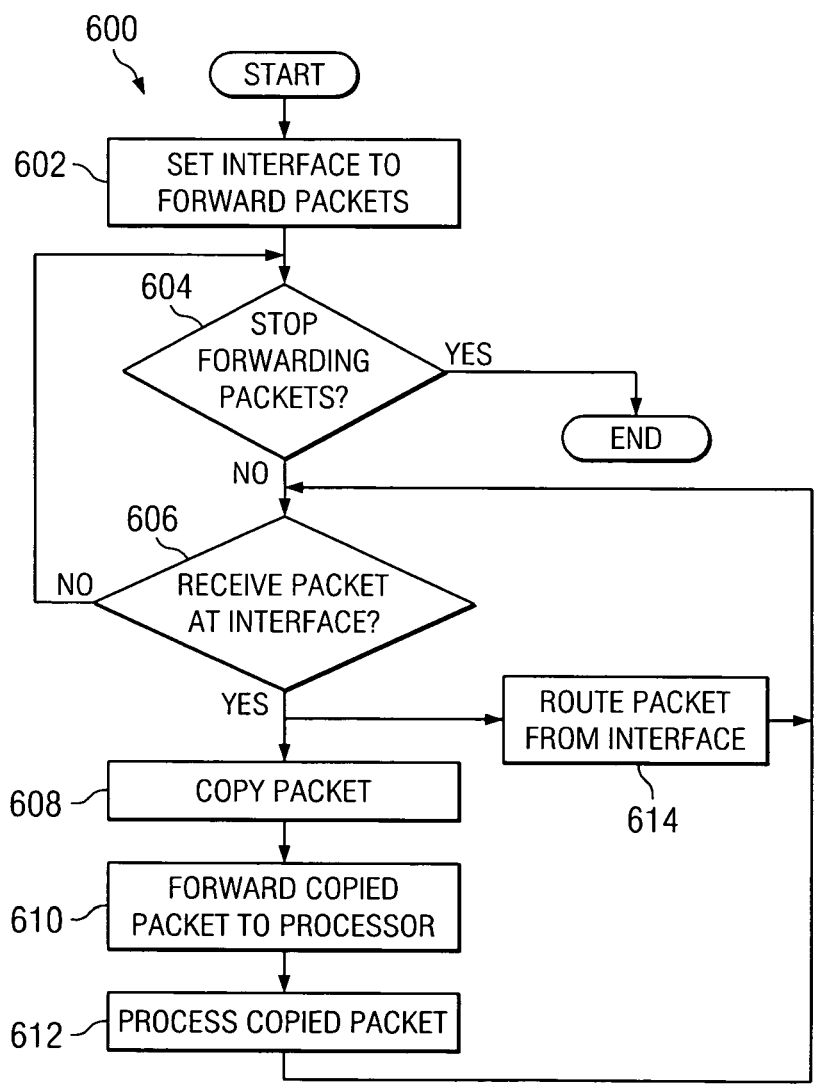
FIG. 6 illustrates an example method for monitoring traffic in a switching device according to one embodiment of this disclosure.

FIG. 6 illustrates an example method 600 for monitoring traffic in a switching device according to one embodiment of this disclosure. For ease of illustration and explanation, the method 600 is described with respect to the system 400 of FIG. 4. However, it should be understood that the method 600 could be used by any other suitable device and in any other suitable system.

To start monitoring, the processor 210 sets an interface (such as port 202 and switch circuit 302) to begin copying and forwarding the copied packets to the processor 210 at step 602 using any packet selection mechanism. For example, the processor 210 can set the filter 402 in switch circuit 302 with a maximum byte count, a time period for forwarding packets and/or maximum amount of time that received packets should be copied and forwarded to the processor 210. As another example, the processor 210 can send a message to the switch circuit 302 requesting it to send a single packet. As a further example, the processor 210 can send a message to the switch circuit 302 to start sending packets or sampling packets. The processor 210 can set two or more interfaces simultaneously or set the interfaces sequentially.

If the interface (such as switch circuit 302) receives a packet 422a at step 606 prior to being instructed to not send any more packets at step 604, the switch circuit 302 copies the received packet at step 608. Thereafter, the switch circuit 302 forwards the copied packet 422b to the processor 210 at step 610. The processor 210 processes the copied packet 422b at step 612 to detect anomalies related to the copied packet 422b. In addition to copying the packet at step 608, the switch circuit 302 further routes the received packet 422a towards the destination (receiving) device identified by the packet header at step 614.

The process continues until the interface is instructed to discontinue sending packets to the processor 210 at step 604. For example, when the maximum byte count or end of time period is reached, the interface can automatically stop copying and sending packets to the processor 210. As another example, when enough packets are received in a buffer in the processor 210, the processor 210 can send another message to the switch circuits 302 to stop sending packets.

Although FIG. 6 illustrates one example of a method 600 for monitoring traffic in a switching device, various changes may be made to FIG. 6. For example, the interface can optionally be set to send only a single packet, thus eliminating the discontinue step 604.

Figure 7:
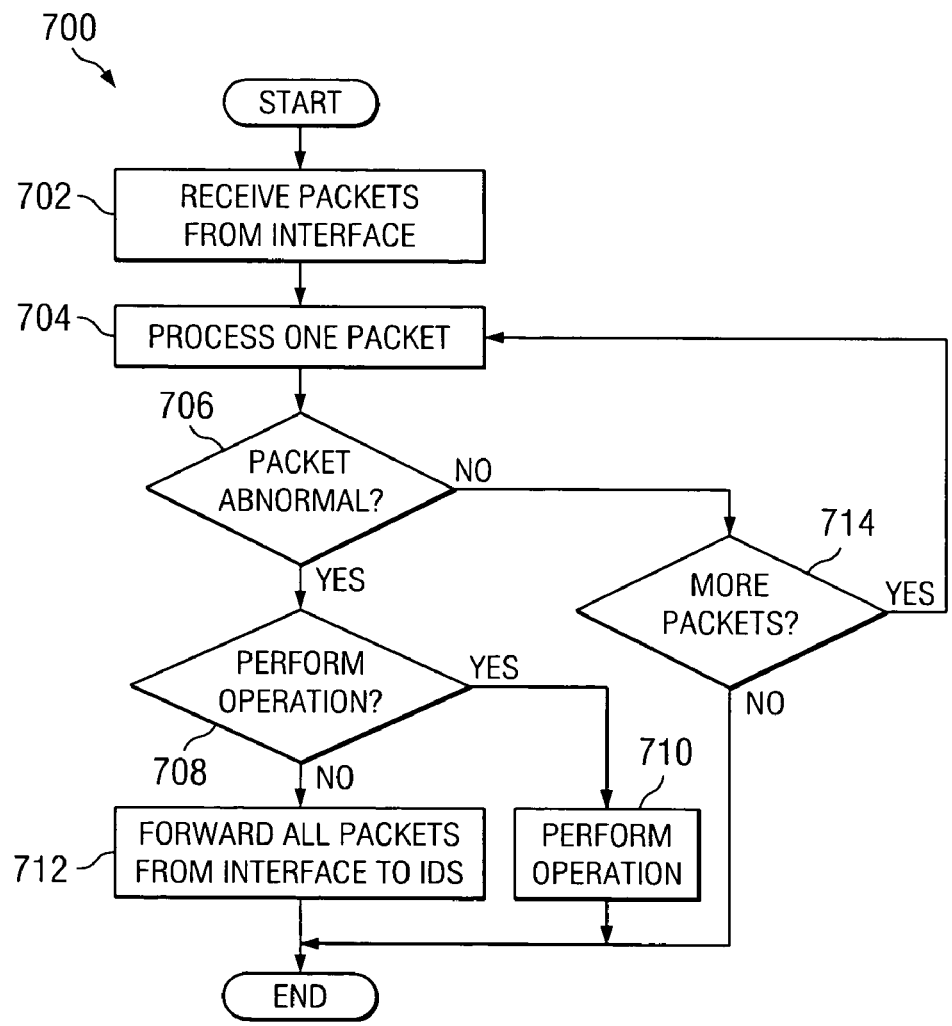
FIG. 7 illustrates an example method for implementing intrusion detection in a switching device according to one embodiment of this disclosure.

FIG. 7 illustrates an example method 700 for implementing intrusion detection in a switching device according to one embodiment of this disclosure. For ease of illustration and explanation, the method 700 is described with respect to the system 400 of FIG. 4. However, it should be understood that the method 700 could be used by any other suitable device and in any other suitable system.

The processor 210 receives a stream of copied packets from a switch circuit (e.g., switch circuit 302) at step 702. The processor 210 processes a first one of the copied packets (e.g., copied packet 422b) to detect any anomalies related to the copied packet 422b at step 704. For example, the processor 210 can compare the copied packet 422b to baseline task information, such as statistical information regarding normal traffic patterns, one or more thresholds against which the packet is measured, protocol port information or a "signature" representing an attack.

If an anomaly is detected at step 706, the processor 210 determines if any tasks need to be performed at step 708. For example, the processor 210 may be programmed to generate an alarm or otherwise notify the network administrator. As another example, the processor 210 may be programmed to terminate the connection associated with copied packet 422b. If the processor 210 is programmed to perform a task, the processor 210 carries out the task at step 710.

If the processor 210 is not programmed to perform a task, the processor 210 forwards all packets received from the switch circuit 302 to the IDS server at step 712. In one embodiment, the processor 210 forwards all packets within the same flow as the abnormal packet 422b. In another embodiment, the processor forwards all packets received from the switch circuit 302, regardless of the flow to which they belong.

If the first packet 422b is not abnormal, the processor 210 determines if there are more packets in the packet stream received from the switch circuit 302 at step 714. If so, the process repeats until a packet is determined to be abnormal or there are no more packets in the packet stream sent by the switch circuit 302.

Although FIG. 7 illustrates one example of a method 700 for implementing intrusion detection in a switching device, various changes may be made to FIG. 7. For example, the processor 210 may be configured to both perform a task at step 710 and forward packets to the IDS server at step 712. As another example, the processor 210 may be configured to forward only the abnormal copied packet 422b to the IDS server 410. Additionally, the processor 210 may be programmed to forward only part of the packets in the same flow or from the same port 302 as copied packet 422b. In other embodiments, the processor 210 may be configured to process each packet in a received packet flow individually, regardless of whether one or more of them are abnormal. In further embodiment, the processor 210 may be configured to process one packet from each different flow until one is determined to be abnormal or there are no more packets in that flow. In still a further embodiment, the processor 210 may be configured to analyze statistical information related to the port or packet to detect an anomaly without requiring the processor 210 to receive a copied packet.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A switching device for detecting unauthorized access in a communications network, said switching device comprising:
   a plurality of input ports;
   a plurality of output ports;
   switch logic coupled to each of the input ports and output ports, the switch logic comprising,
      a plurality of switch circuits corresponding to the plurality of input ports, each switch circuit operable for receiving incoming original packets from its corresponding input port and copy a selected number of the incoming original packets to create a limited number of copied packets, and wherein the selected number depends on a packet selection mechanism; the packet selection mechanism including a maximum byte count, a time period for forwarding packets, a maximum amount of time that received packets should be copied, and a specified number of packets, and
   wherein the switch logic is operable to route the incoming original packets from each input port to one of the output ports using a routing table;
   a processor operable to analyze information related to the incoming original packets and the limited number of copied packets from each input port to detect an anomaly related to the incoming original packets and the limited number of copied packets from each input port, the processor being further operable to cause the limited number of copied packets to be forwarded to an intrusion detection system within the communications network upon detecting the anomaly, the copied packets including a monitor field which when set directs the processor to process the packet to detect an anomaly related to the copied packets;
   wherein the processor is further operable to analyze a copied packets relationship to adjacent and related packets to detect an anomaly related to the copied packets; and wherein when an anomaly is detected said processor terminates a connection associated with said copied packets.

2. The switching device in accordance with claim 1 wherein the switch logic is further operable to route the received incoming original packets towards one or more destination devices identified in the received incoming original packets.

3. The switching device in accordance with claim 1 wherein the processor is operable to set a maximum byte count as the selected number.

4. The switching device in accordance with claim 1 wherein the information relates to the incoming original packets and includes statistical information related to one of the input ports.

5. The switching device in accordance with claim 4 wherein the processor is further operable to perform a task upon detecting the anomaly.

6. The switching device in accordance with claim 5 wherein the incoming original packets is associated with a flow, and wherein the processor is further operable to cause a plurality of packets related to the flow to be forwarded to the intrusion detection system.

7. The switching device in accordance with claim 4 wherein the statistical information is statistical port information of one of the ports maintained by one of the switch circuits corresponding to the one port.

8. The switching device in accordance with claim 1 wherein the information relates to the limited number of copied packets.

9. The switching device in accordance with claim 8 wherein the incoming original packets is associated with a connection, and wherein the task includes terminating the connection.

10. The switching device in accordance with claim 8 wherein the incoming original packets is associated with a flow, and wherein the processor is further operable to cause a plurality of packets related to the flow to be forwarded to an intrusion detection system.

11. The switching device in accordance with claim 1 wherein said processor is further operable to compare the information to a threshold to detect the anomaly.

12. A method for detecting unauthorized access on a switching device in a communications network, the method comprising:

receiving, by the switching device, a plurality of original packets from a plurality of input ports;

copying, by the switching device, a selected number of the plurality of received original packets according to a packet selection mechanism, the packet selection mechanism including at a maximum byte count, a time period for forwarding packets, a maximum amount of time that received packets should be copied, and a specified number of packets;

routing, by the switching device, the received original packets to at least a one of a plurality of output ports based on a routing table;

analyzing, by the switching device, information related to the incoming original packets and the limited number of copied packets from each input port to detect an anomaly related to the incoming original packets and the limited number of copied packets from each input port;

causing, by the switching device, the copied packets to be forwarded to an intrusion detection system within said communications network upon detecting the anomaly, the copied packets including a monitor field which when set directs the switching device to process the packet to detect an anomaly related to the copied packet, wherein the switching device is further operable to analyze a copied packets relationship to adjacent and related packets to detect an anomaly related to the copied packets; and wherein when an anomaly is detected said switching device terminates a connection associated with said copied packets.

13. The method in accordance with claim 12 further comprising:

routing the received plurality of original packets towards one more destination devices identified in received original packets.

14. The method in accordance with claim 12 further comprising: setting a maximum byte count as the selected number.

15. The method in accordance with claim 12 wherein the information relates to the incoming original packets and includes statistical information related to one of the input ports.

16. The method in accordance with claim 15 further comprising: performing a task upon detecting the anomaly.

17. A method in accordance with claim 16 wherein the incoming original packets is associated with a flow, and the method further comprises:

causing a plurality of packets related to the flow to be forwarded to the intrusion detection system.

18. The method in accordance with claim 12 further comprising: performing a task upon detecting the anomaly.

19. A method in accordance with claim 18 wherein at the incoming original packets is associated with a flow, and the method further comprises:

causing a plurality of packets related to the flow to be forwarded to an intrusion detection system.

* * * * *